(12) United States Patent
Costabeber

(10) Patent No.: US 10,406,755 B2
(45) Date of Patent: Sep. 10, 2019

(54) PRINTING UNIT CONFIGURED FOR THE VALIDATION OF CONSUMABLE ELEMENTS SUITED TO BE INSTALLED ON A PLURALITY OF STEREOLITHOGRAPHY MACHINES

(71) Applicant: DWS S.R.L., Thiene (IT)

(72) Inventor: Ettore Maurizio Costabeber, Zane' (IT)

(73) Assignee: DWS SRL, Thiene (IT)

( * ) Notice: Subject to any disclaimer, the term of this patent is extended or adjusted under 35 U.S.C. 154(b) by 119 days.

(21) Appl. No.: 15/738,372

(22) PCT Filed: Jun. 20, 2016

(86) PCT No.: PCT/IB2016/053659
§ 371 (c)(1),
(2) Date: Dec. 20, 2017

(87) PCT Pub. No.: WO2016/207777
PCT Pub. Date: Dec. 29, 2016

(65) Prior Publication Data
US 2018/0178452 A1     Jun. 28, 2018

(30) Foreign Application Priority Data

Jun. 25, 2015 (IT) .................. 102015000027640

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/135* (2017.08); *B29C 64/386* (2017.08);
(Continued)

(58) Field of Classification Search
CPC ... B29C 64/129; B29C 64/135; B29C 64/386; B29C 64/393; B33Y 50/02; G05B 19/4188; G05B 2219/32173
See application file for complete search history.

(56) References Cited

U.S. PATENT DOCUMENTS

| 2007/0075459 A1* | 4/2007 | Reynolds ............... B33Y 30/00 264/401 |
| 2008/0231731 A1* | 9/2008 | Hull ...................... B33Y 50/02 348/241 |

(Continued)

FOREIGN PATENT DOCUMENTS

| EP | 1 769 904 A2 | 4/2007 |
| EP | 1 950 032 A2 | 7/2008 |

(Continued)

OTHER PUBLICATIONS

International Search Report related to PCT/IB2016/053659, dated Oct. 14, 2016 (6 pgs.).

(Continued)

*Primary Examiner* — Kenneth M Lo
*Assistant Examiner* — Chad G Erdman
(74) *Attorney, Agent, or Firm* — Husch Blackwell LLP

(57) ABSTRACT

The invention is a method for the validation of one or more consumable elements (4) suited to be installed on a stereolithography machine (2) for printing three-dimensional objects through a stereolithography process. The method includes the steps of installing a consumable element (4) provided with a readable univocal identification code (ID) on the stereolithography machine (2), reading said univocal identification code (ID), verifying that the univocal identification code (ID) is authentic and active by making a comparison against a predefined list (L) of authentic and active identification codes and enabling the use of the consumable element (4) on the stereolithography machine (Continued)

(2) in the case where the corresponding univocal identification code (ID) is authentic and active.

18 Claims, 6 Drawing Sheets

(51) Int. Cl.
    *G05B 19/418*      (2006.01)
    *B29C 64/135*      (2017.01)
    *B29C 64/386*      (2017.01)
    *B29C 64/129*      (2017.01)

(52) U.S. Cl.
    CPC .......... *B33Y 50/02* (2014.12); *G05B 19/4188* (2013.01); *B29C 64/129* (2017.08); *G05B 2219/32173* (2013.01)

(56) References Cited

U.S. PATENT DOCUMENTS

| | | | |
|---|---|---|---|
| 2010/0038268 A1* | 2/2010 | Reynolds | B33Y 30/00 206/232 |
| 2014/0265049 A1* | 9/2014 | Burris | B23K 26/034 264/497 |
| 2017/0137327 A1* | 5/2017 | Capobianco | C04B 35/64 |

FOREIGN PATENT DOCUMENTS

| | | |
|---|---|---|
| WO | 2014020401 | 2/2014 |
| WO | 2014111587 | 7/2014 |

OTHER PUBLICATIONS

Written Opinion of the International Searching Authority related to PCT/IB2016/053659, dated Oct. 14, 2016 (7 pgs.).

* cited by examiner

PRINTING UNIT CONFIGURED FOR THE VALIDATION OF CONSUMABLE ELEMENTS SUITED TO BE INSTALLED ON A PLURALITY OF STEREOLITHOGRAPHY MACHINES

The present invention concerns a method for the validation for use of consumable elements suited to be installed on a stereolithography machine belonging to a printing unit.

The invention concerns also a method for enabling the printing of three-dimensional objects through a stereolithography machine belonging to a printing unit.

Furthermore, the invention concerns a printing unit comprising at least one stereolithography machine and configured in such a way as to carry out the steps of said methods for the validation of consumable elements and for enabling the printing of three-dimensional objects.

As is known, the stereolithography technique makes it possible to produce a three-dimensional object through the superimposition of a plurality of layers of a base material, liquid or pasty, which is solidified through exposure to predefined radiation, generally light radiation.

A stereolithography machine of the known type comprises a vat suited to contain the base material, which is provided with a bottom that is transparent to the predefined radiation.

The machine furthermore comprises emitter means suited to emit said predefined radiation and arranged under the vat, which selectively solidify the layer of base material that is adjacent to the bottom of the vat.

The solidified layers are supported by a modelling platform that is motorized so that it moves in the vertical and orthogonal direction with respect to the bottom of the vat in order to arrange the last solidified layer so that it is adjacent to said layer of base material before its solidification.

It is also known that in the most recent stereolithography machines said vat is of the removable and replaceable type, since after an undetermined number of printing processes the transparent bottom of the vat itself tends to deteriorate, consequently worsening the quality of the three-dimensional object obtained through the stereolithography process.

Furthermore, as is known, said stereolithography machines are configured in such a way as to accommodate recharge cartridges containing said base material that, when needed, is forced out of said recharge cartridge and conveyed into the vat through valve means that connect said two elements.

Also said recharge cartridges, once they have run out, can be removed from the stereolithography machine and replaced with recharge cartridges filled with other base material.

Generally, in the common jargon, as well as in this context, the elements like said vats and the recharge cartridges of the removable type for stereolithography machines are known as consumable elements for stereolithography machines, that is, accessories that can be installed on said machines and that can be removed and replaced at the moment when they deteriorate or are no longer able to fulfil their function due to the fact that they have been used for an undetermined but however limited period of time.

The advantage offered by the use of said consumable elements lies in that the use and maintenance of the stereolithography machine are considerably simplified, making it suited to be used also by an unskilled operator like, for example, an operator who works in the jewellery or dental sector.

However, to disadvantage, the sale and use of the so-called consumable elements known as "compatible" or "remanufactured" elements is spreading increasingly.

"Compatible" consumable elements are those consumable elements which are produced by a given company and are suited to be installed on a type of stereolithography machine produced by a different manufacturer. "Remanufactured" consumable elements, instead, are those elements, like exhausted recharge cartridges, which are produced by the same company that markets the stereolithography printers but recharged with a base material produced by other manufacturers, so that they can be reused.

In both cases, it can very often be observed that the quality of the "compatible" or "remanufactured" consumable elements is much lower than that of the so-called authentic elements, meaning those produced and marketed by the manufacturer of the stereolithography machines. Consequently, it can be observed that the use of said non-authentic consumable elements very often leads to a worsening of the quality of the three-dimensional objects produced, even if high-quality stereolithography machines are used.

In particular, in the case of use of the so-called "compatible" or "remanufactured" recharge cartridges, there is actually the risk that the base material contained therein may not be appropriate and may not be compatible with the characteristics of said stereolithography machine.

Furthermore, the use of "compatible" consumable elements may also lead to the rapid deterioration of the internal components that make up the stereolithography machine itself.

The present invention intends to overcome all of the drawbacks mentioned above.

In particular, it is one of the objects of the invention to provide a method for the validation of consumable elements and a method for enabling the printing of three-dimensional objects that prevent the use of consumable elements that, even if they are sold as compatible elements, are not perfectly suited to be used with certain types of stereolithography machines.

It is thus the object of the present invention to provide a validation method and a method for enabling the printing process that make it impossible to use low-quality consumable elements and, in particular, low-quality base materials.

It is another, yet not the least important object of the invention to provide a validation method and a method for enabling the printing process that make it impossible to use consumable elements that may deteriorate the internal components of the stereolithography machine on which they are installed.

The said objects are achieved by the validation method developed according to the main claim.

The said objects are also achieved by the method for enabling the printing process developed according to claim 8, by the printing unit according to claim 9 and by the computer program product according to claim 17.

Variant embodiments of the invention are specifically described in the corresponding dependent claims.

Advantageously, the implementation of the methods that are the subjects of the invention and the use of the printing unit of the invention allow the manufacturer of the stereolithography machines and of the consumable elements to monitor the consumption of said consumable elements, in particular of the base material used by the users and by the companies that own said stereolithography machines. Said monitoring activity is however carried out while at the same time guaranteeing the privacy of said users and companies.

Said objects and advantages, together with others that will be mentioned here below, will be evident in the description of a preferred embodiment of the invention that is provided by way of non-limiting example with reference to the attached drawings, wherein.

METHOD FOR THE VALIDATION OF CONSUMABLE ELEMENTS PROVIDED WITH A UNIVOCAL IDENTIFICATION CODE

Figure 1:
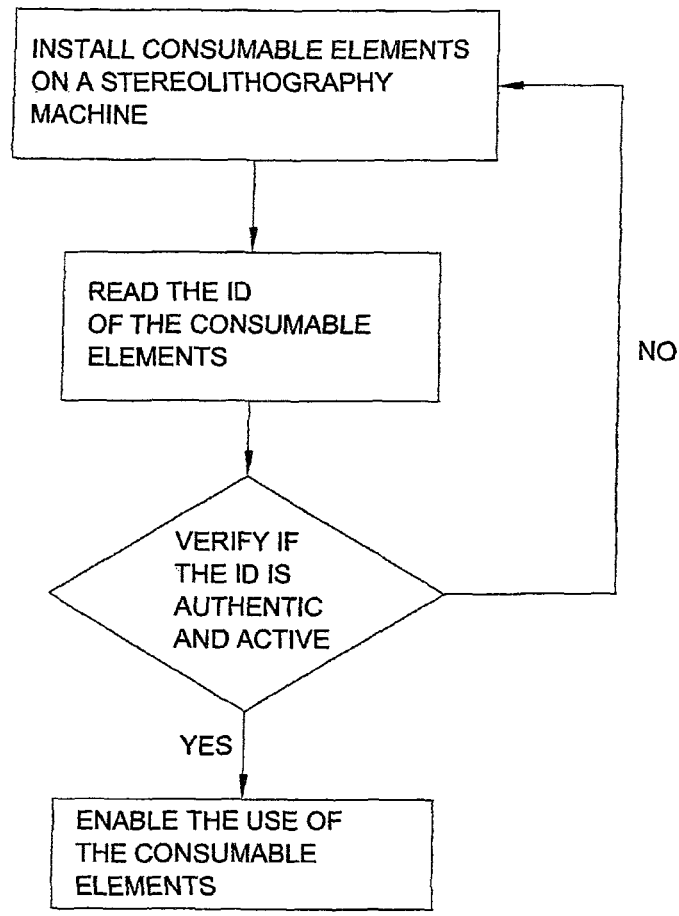
FIG. 1 shows the flow diagram illustrating the operational steps belonging to the method that is the subject of the invention for the validation of consumable elements suited to be installed on a stereolithography machine.

The method that is the subject of the invention, whose operational steps are illustrated in the flow diagram shown in FIG. 1, has been developed for the purpose of making it possible to validate and, consequently, enable the use of one or more consumable elements installed on a stereolithography machine for printing three-dimensional objects through a stereolithography process. As stated during the description of the known art, consumable elements are those accessories for stereolithography machines, such as recharge cartridges containing the base material to be used to make the three-dimensional objects and vats suited to contain said base material during the printing process, which deteriorate or are no longer able to fulfil their function after they have been used for an undetermined but limited period of time, and therefore need to be replaced.

According to the invention, the present validation method includes the step of installing at least one consumable element provided with a readable univocal identification code on said stereolithography machine.

Clearly, the use of said univocal identification code allows each consumable element to be made univocally identifiable with respect to other consumable elements. Usually, the univocal identification code is assigned to and is reproduced on each consumable element by the company the produces and markets it. Furthermore, this company is usually the manufacturer and seller of said stereolithography machines.

Furthermore, in the present context and as will be defined in greater detail below, the adjective "readable" means that said univocal identification code can be "read" by human beings or by suitable automatic reading devices.

According to the preferred embodiment of the invention, the method includes the installation on the stereolithography machine, and therefore the validation, of at least one recharge cartridge provided with said univocal identification code and containing the base material to be used for making three-dimensional objects, and of at least one vat suited to contain the same base material, which is also provided with a univocal identification code. It cannot be excluded, however, that the method of the invention may be implemented only and exclusively to verify the validity of one or more recharge cartridges or, alternatively, one or more vats. Furthermore, it cannot be excluded that the method of the invention may be implemented to verify the validity of consumable elements of a different type with respect to the recharge cartridges and the vats, on condition that they are provided with their own univocal identification code and on condition that they can be installed on a stereolithography machine.

In any case, according to the method of the invention, the univocal identification codes that are associated with the consumable elements are read once the latter have been installed on the stereolithography machine.

In particular, according to the preferred embodiment of the invention, the univocal identification codes of the recharge cartridge and of the vat that are installed on the stereolithography machine are read.

The procedures based on which said reading operation is performed are illustrated in detail here below, in the description of the printing unit that is the subject of the invention and that, according to a preferred embodiment, is configured in such a way as to carry out the steps of this validation method.

Going back to the method of the invention, the step which follows the reading of the univocal identification codes is the step of verifying if each one of them is authentic and active.

In this context, as already mentioned above, the univocal identification code and, consequently, the consumable element with which it is associated are considered "authentic", or even "original", if the first is defined and the second is produced and marketed by the same company that manufactures and sells the stereolithography machines on which said consumable element is intended to be installed.

Furthermore, a univocal identification code and, consequently, the corresponding consumable element are defined as "active" if the same code has not been previously read and verified, or, even if it has already been read, the number of readings is smaller than a pre-established number of readings, or if the conditions of the consumable element are still within pre-established limits, as will be specifically clarified below with regard to the recharge cartridges and the vats. Said pre-established number of readings can be equal to or higher than one.

Advantageously, as stated before, the operation of verifying whether the consumable element is associated with an authentic univocal identification code makes it possible to avoid the use, on a particular stereolithography machine, of accessories and, in the case of recharge cartridges, of base materials for making three-dimensional objects that are not compatible with and of lower quality than those produced and marketed by the company that sells also the stereolithography machine itself. In particular, the validation method of the invention makes it possible to avoid the use of low-quality light sensitive resins for making three-dimensional objects through a stereolithography process, or the use of light sensitive resins which are not compatible with the characteristics of the radiation emitter with which the stereolithography machine is provided.

Furthermore, the operation of determining whether a specific univocal identification code associated with a consumable element, although authentic, has already been read and verified or whether it has exceeded the limits of use, as specified below, a condition hereinafter defined as "inactive", makes it possible to prevent a user from reusing, for example, an authentic recharge cartridge by filling it, after it has been used for a given, authorized number of times, with resins or, in general, with base materials produced and marketed by other companies. If this last operation were permitted, in fact, the situation may occur, where resins are used which are not compatible with the characteristics of a specific stereolithography machine and whose quality is probably low.

According to the method of the invention, in order to implement said verification step a predefined list of univocal identification codes must be made available, wherein said univocal identification codes are considered authentic and active and are associated with the consumable elements produced and marketed by a specific company.

Therefore, a univocal identification code is considered authentic simply when it is included in said predefined list.

Therefore, the verification step consists in comparing the univocal identification code read on the consumable element with the univocal identification codes, considered authentic and active, which are included in said predefined list.

Preferably, said list is defined by the same company that produces and markets the consumable elements provided with said univocal identification codes as well as the specific stereolithography machines.

Still preferably, as is described in detail below, the list is made available on a server, usually a remote server, capable of communicating autonomously with each one of said stereolithography machines, in such a way as to allow said verification step to be carried out.

Furthermore, according to the method of the invention, if each univocal identification code is authentic and active, the use of the corresponding consumable elements installed on said stereolithography machine is enabled.

It cannot be excluded, however, that according to an alternative embodiment of the validation method of the invention, the enabling procedure may be managed independently for each consumable element. In other words, according to said alternative embodiment of the invention, in the case where several consumable elements are installed on a stereolithography machine, the enabling of each one of them depends exclusively on whether the corresponding univocal identification code is authentic and active, independently of the outcome of the verification of the other univocal identification codes associated with the remaining consumable elements.

According to the method of the invention, in the specific case where a consumable element installed on the stereolithography machine corresponds to a recharge cartridge, said enabling step first of all includes the at least partial transfer of the material contained in the same recharge cartridge into a vat arranged on the stereolithography machine. As described in greater detail below, said transfer is preferably but not necessarily carried out by the stereolithography machine in an automated manner.

Furthermore, the enabling step includes the calculation of the value of the total quantity of material available for the stereolithography machine, also called "print credit" in technical jargon, by adding the quantity of material transferred during said transfer operation to the quantity of material previously associated with the same stereolithography machine.

Clearly, if no "print credit" were associated with the stereolithography machine before said transfer operation, the value of the total quantity of material calculated would be equivalent to the quantity of material transferred.

Successively, the enabling step belonging to the method of the invention also includes the step of associating the calculated value with the specific stereolithography machine and storing this association in such a way as to be able to use this information at a later moment, as is shortly explained in greater detail.

As for the predefined list of univocal identification codes, also this information, according to the preferred embodiment of the printing unit of the invention described below, is preferably stored in a remote server made available by the company that manufactures and sells said consumable elements and the stereolithography machines.

Finally, as regards, again, the specific enabling step related to a recharge cartridge, it includes the modification of the state of the corresponding univocal identification code from active to inactive in said predefined list, in the case where said base material has been completely transferred from the recharge cartridge into the vat.

As already stated, this last operation advantageously makes it possible to prevent a recharge cartridge from being reused once the respective base material originally contained therein has been completely transferred into one or more vats.

As regards, instead, the specific enabling step related to a vat provided with a univocal identification code and installed on said stereolithography machine, according to the invention it includes the step of associating said univocal identification code with the number of times the same vat has been used. In other words, according to the invention the number of readings of the code is increased, and consequently also the number of times the specific vat has been installed and used on a stereolithography machine is also increased. The enabling step successively includes the step of storing said association, preferably in said remote server. Said information advantageously makes it possible to limit the use of the specific vat to a predefined number of times. In fact, the enabling step belonging to the method of the invention furthermore includes, for the vats, the step of modifying the state of the corresponding univocal identification codes from active to inactive in said predefined list, at the moment when the stored number of times a specific vat has been used reaches or exceeds said predefined number of times.

Preferably but not necessarily, the validation method of the invention, in particular the enabling step related to the vats, furthermore includes the step of associating the univocal identification code of each vat with the type of base material transferred inside it from one or more recharge cartridges during said transfer operation. The method of the invention finally includes the step of storing said association, preferably in said remote server.

Advantageously, said last association makes it possible to also check, during said operation of verification, the type of material possibly contained therein before, independently of whether the univocal identification code related to the vat is active or not. Therefore, said association and the related verification make it possible to avoid the use, at different moments, of a specific vat to contain different types of base material. This, in particular, makes it possible to advantageously avoid the risk of mixing in the same vat and contaminating, for example, two different types of resins that are incompatible with each other. It cannot be excluded, in general, that, according to alternative embodiments of the method of the invention, the enabling step related to consumable elements different from recharge cartridges and from vats may include the execution of further and different operations. Nevertheless, in respect of all the consumable elements provided with a univocal identification code and suited to be installed on a specific stereolithography machine, the enabling step of the validation method must include the modification of the state of said univocal identification code from active to inactive in said predefined list, in the case where it is not possible to observe specific pre-established conditions for each type of consumable element.

Method for Enabling the Printing Process.

Figure 2:
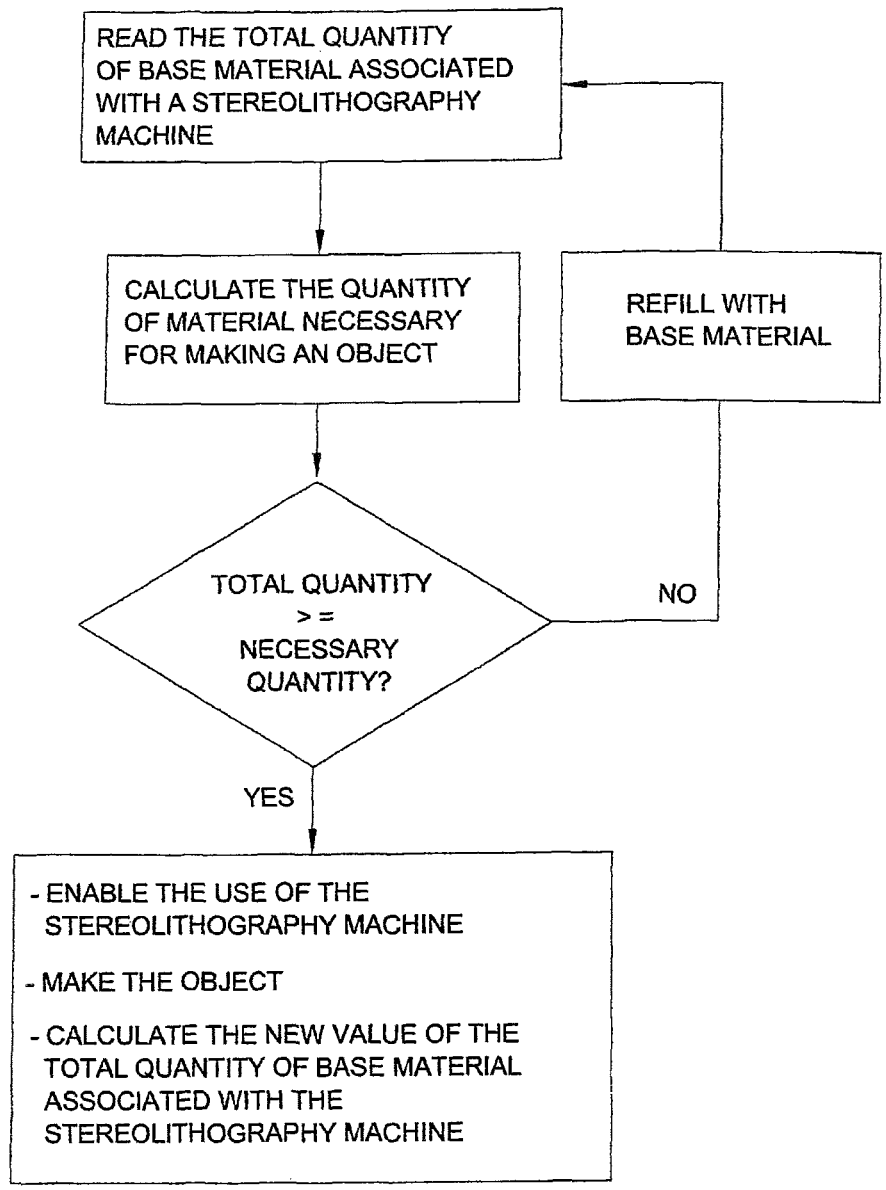
FIG. 2 shows the flow diagram illustrating the operational steps belonging to the method of the invention for enabling a stereolithography machine to carry out the printing process.

Once said series of steps related to the method of the invention for the validation of one or more consumable elements has been completed, the stereolithography machine is ready to print three-dimensional objects through a stereolithography process. However, according to the present invention, further steps must be performed before allowing the execution of said printing process, wherein said further steps described in detail below and represented in the flow diagram shown in FIG. 2 belong to a further method for enabling, in fact, the printing process.

It should be first stated that, for the sake of simplicity, the steps of said method are described making reference to a single stereolithography machine. However, as specified below, said steps may be related to a plurality of stereolithography machines considered as a single entity, that is, as a set of machines at the disposal of a single company. First of all, the method for enabling the printing process that is the subject of the invention includes the step of reading the previously stored value related to the total quantity of base material associated with the specific stereolithography machine to be used. In other words, the method includes the reading of the print credit of the specific stereolithography machine. Furthermore, the method of the invention includes the step of calculating the quantity of base material that is necessary for making a specific three-dimensional object. Having said two pieces of information available, the method of the invention provides for comparing them, in such a way as to verify whether the total quantity of base material, that is, the print credit, associated with the stereolithography machine exceeds the quantity of base material that is necessary for making said three-dimensional object. In the case where the outcome of said verification is positive, the method of the invention provides for enabling the use of the stereolithography machine for printing the three-dimensional object.

In practice, said series of steps making up the enabling method of the invention advantageously makes it possible to verify whether a user or a company that is the owner of the stereolithography machine has acquired a quantity of the so-called "authentic" base material that is sufficient to produce a specific three-dimensional object. If not, the printing process is not enabled. Consequently, said method advantageously makes it possible to prevent a user or a company from printing three-dimensional objects by means of said stereolithography machines using a non-authentic base material.

Going back to the method of the invention, once the use of the stereolithography machine has been enabled, according to said method it is possible to proceed with the production of the three-dimensional object in question. It may happen that, for any reason, the object is carried out only partially. In any case, according to the method of the invention, at the end of said step of production of the object, even if partial, the quantity of base material actually used during said production step is calculated and said actual quantity is deducted from the total quantity of base material previously associated with the stereolithography machine. The result obtained from said operation is associated with the same stereolithography machine and stored as a print credit for the successive uses.

As already mentioned above, according to a variant embodiment of the invention, the method for enabling the printing process could be applied to a plurality of stereolithography machines located in the same site and for this reason managed as a single entity. In other words, according to said variant embodiment of the method, said plurality of stereolithography machines is associated with a single print credit, independently of the quantity of material actually contained in the vat of each one of them. Consequently, the printing process is enabled at the moment when said print credit associated with the plurality of stereolithography machines is sufficient to make the object or the specific objects that have to be produced.

Printing Unit.

As already mentioned above, the invention includes also the printing unit 1 configured in such a way as to implement the validation method and the method for enabling the printing process described above.

Figure 3:
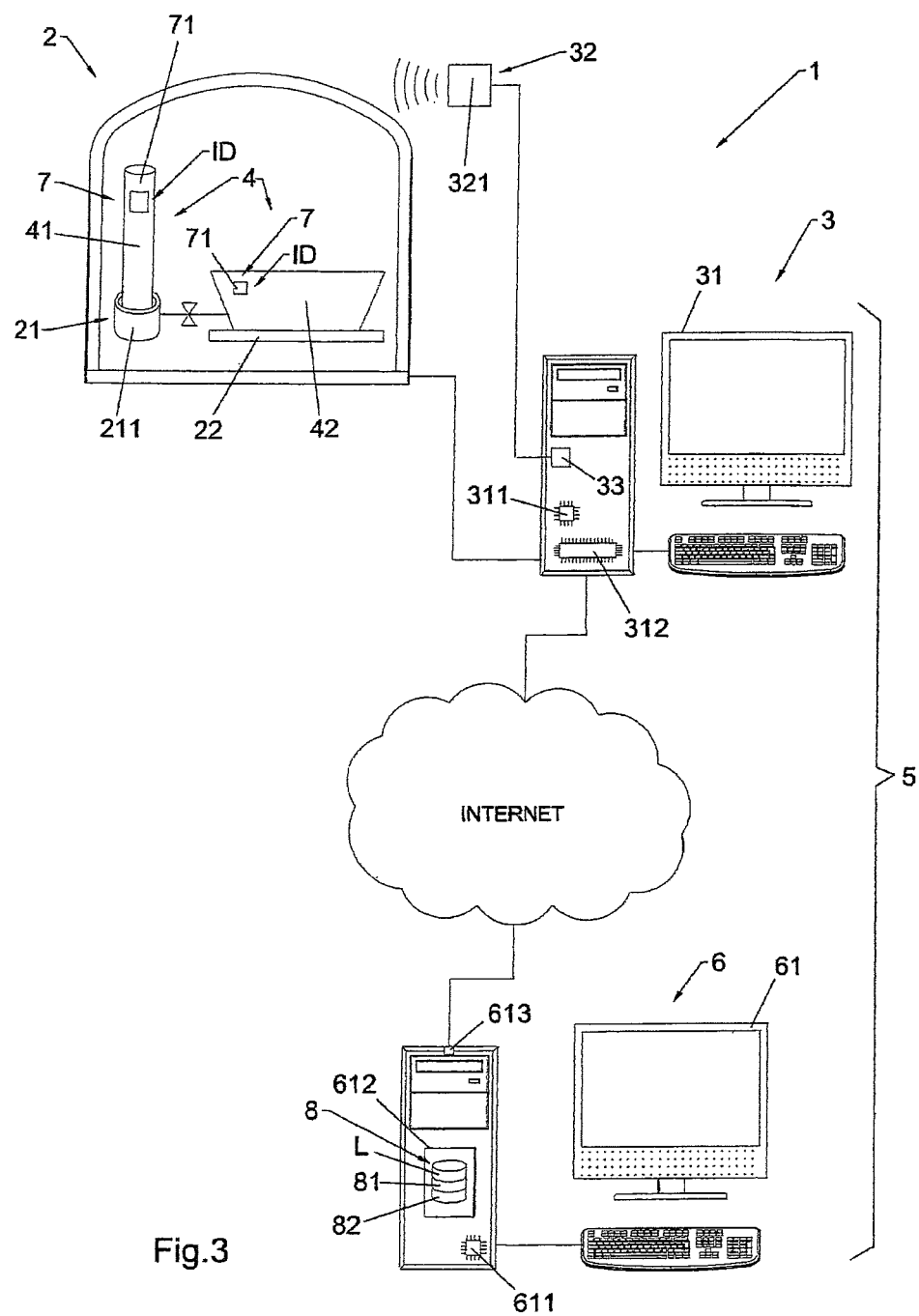
FIG. 3 shows a schematic structural diagram of the printing unit that is the subject of the invention according to the preferred embodiment of the invention.

In particular, as shown in the diagram of FIG. 3, according to the preferred embodiment of the invention, the printing unit 1 comprises a stereolithography machine 2 and a data processing unit 3 configured to manage the functions of the stereolithography machine 2, so that it is possible to print three-dimensional objects through a stereolithography process.

Figure 4:
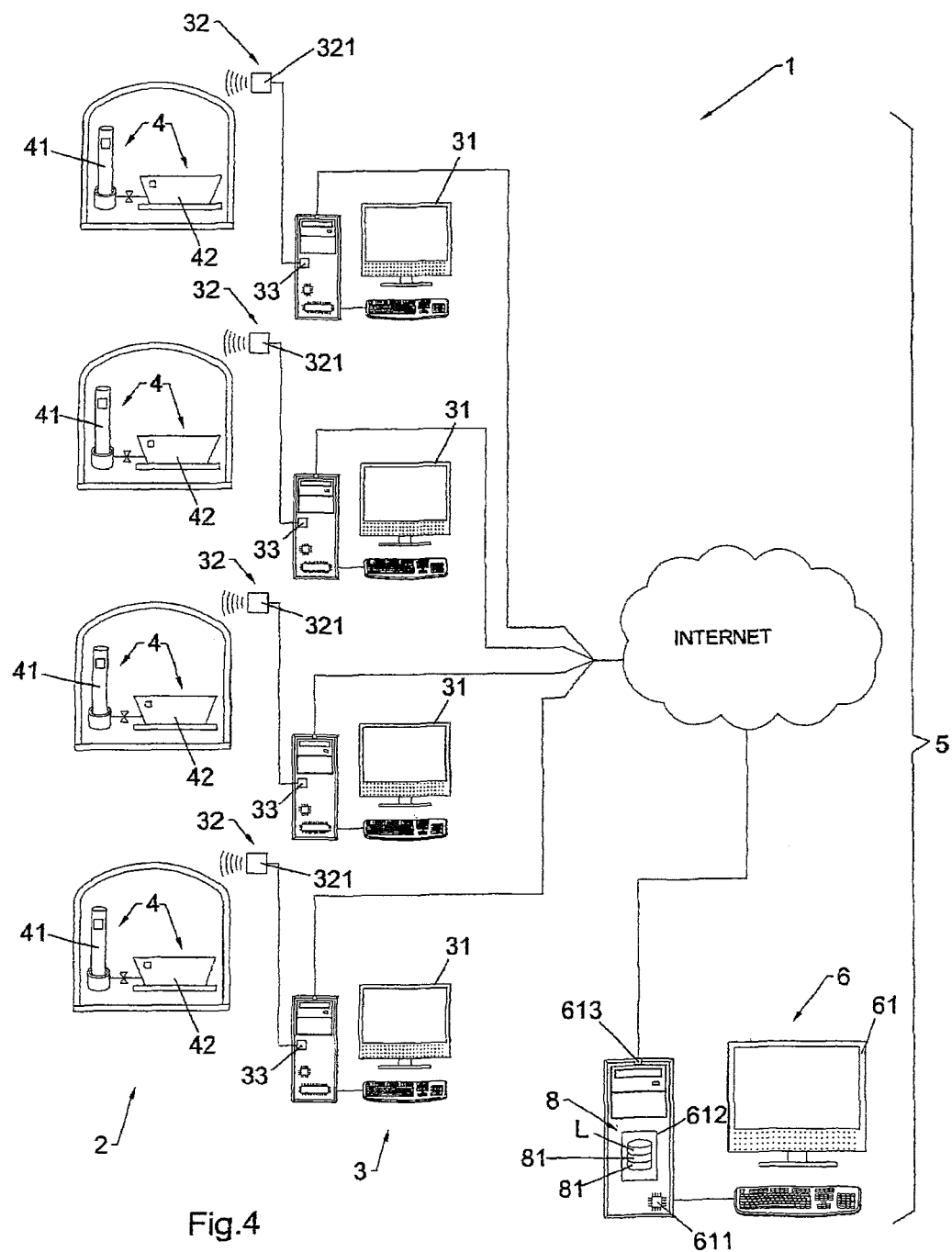
FIG. 4 shows a schematic structural diagram of the printing unit of the invention according to a first alternative embodiment.

It cannot be excluded, however, that in alternative variant embodiments of the invention the printing unit 1 may comprise more than one stereolithography machine 2, each one of which is associated with a corresponding data processing unit 3, as shown in the diagram of FIG. 4.

Furthermore, according to other alternative embodiments of the invention that are not represented in the figures, a plurality of stereolithography machines 2 may be associated with a single data processing unit 3 capable of managing the functions of all of said machines at the same time.

Figure 6:
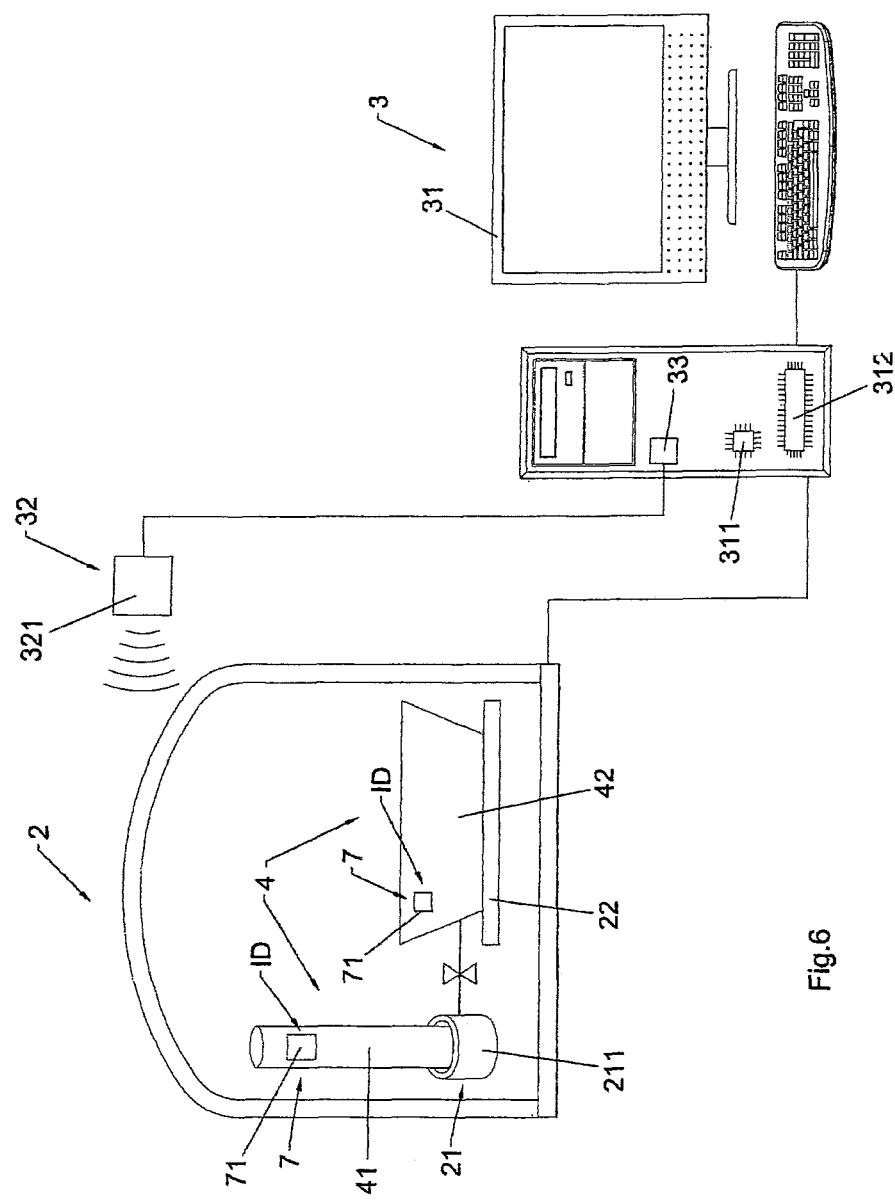
FIG. 6 shows a schematic view of the detail comprising a data processing unit and a stereolithography machine belonging to the printing unit of the invention.

With regard to the data processing unit 3, as schematically shown in FIG. 6, it comprises a computer 31 operatively connected to the corresponding stereolithography machine 2 or, alternatively, to more than one stereolithography machine 2. Said computer 31 comprises, in turn, a microprocessor 311 and storage means 312 in which a specific computer program is stored that is capable of managing the printing operations of the stereolithography machine 2, when said computer program is being executed in the same computer 31.

As regards, instead, the stereolithography machine 2, as can be observed always in FIG. 6, it comprises first coupling means 21 suited to allow it to be coupled with at least one recharge cartridge 41 of the base material to be used for making three-dimensional objects and second coupling means 22 suited to allow it to be coupled with at least one vat 42 containing said base material during the execution of said stereolithography process.

According to the invention, the printing unit 1 comprises a validation system, indicated as a whole by 5 in Figures from 3 to 5, suited to validate one or more consumable elements 4, preferably a recharge cartridge 41 and a vat 42, which are suited to be installed on said stereolithography machine 2 and each one of which is provided with a readable univocal identification code ID.

In particular, the validation system 5 is configured to read the univocal identification code ID of each one of said consumable elements 4 and to compare each univocal identification code ID read against a predefined list L of univocal identification codes ID considered authentic and active and related to the consumable elements 4 produced and marketed by one or more companies. Therefore, said comparison makes it possible to verify whether each univocal identification code ID is authentic and active or not. The validation system 5 is configured in such a way that, only in the case where all of said univocal identification codes ID are authentic and active, it will be capable of enabling the use of the consumable elements 4.

According to the preferred embodiment of the printing unit 1 of the invention, the validation system 5 comprises, first of all, said data processing unit 3 provided with reading means 32 suited to read the univocal identification code ID of the various consumable elements 4. Preferably, said reading means 32 are located on the stereolithography machine 2, in proximity to the recharge cartridge 41 and to the vat 42, in such a way that they can read the univocal identification codes ID reproduced therein, when both of them are installed on said stereolithography machine 2.

Preferably, the means 32 for reading the univocal identification code ID comprise a Near Field Transceiver, preferably a RFID transceiver 321 of the known type. In turn, each one of the consumable elements 4, in particular the recharge cartridge 41 and the vat 42, comprises a storage and transmission device 7, preferably a RFID tag 71, in which said univocal identification code ID is previously stored.

It cannot be excluded, however, that in alternative embodiments of the invention the reading means 32 suited to read the code ID and the storage and transmission devices 7 can be implemented with different known technologies, provided that they are capable of establishing Near Field Communication with each other or, even more generally, provided that the first ones are capable of reading the univocal identification code ID reproduced on the second ones.

Regarding, furthermore, the data processing unit 3, it is provided with transceiver means 33 configured to transmit the univocal identification code or codes ID read to a data processing control apparatus 6 also belonging to the validation system 5 of the invention and described in detail here below.

In particular, depending on the type of data processing control apparatus 6 used, as defined in detail below, said transceiver means 33 can be configured in such a way as to establish communication through a wired network of the local (Intranet) or remote (Internet) type or to allow communication of the wireless type, for example through a WLAN or cellular network.

As far as the data processing control apparatus 6 is concerned, according to the preferred embodiment of the invention represented in FIGS. 3 and 4, it comprises a remote server 61 operatively connected to said data processing unit 3 through its own transceiver means 613 and the Internet. Preferably, said remote server 61 is provided by the same company that produces and markets said stereolithography machines 2 and the consumable elements 4 provided with a univocal identification code ID.

According to the invention, said remote server 61 is also provided with a microprocessor 611 and storage means 612 suited to store said predefined list L of univocal identification codes ID, considered authentic and active and related to the consumable elements 4 produced and marketed by said company.

In particular, the predefined list L of univocal identification codes ID is stored and organized in said storage means 612 inside an appropriate database 8 defined by said company.

Preferably, the predefined list L is divided into sub-lists $L_1, L_2, L_3 \ldots$, each one of which comprises the univocal identification codes ID of specific consumable elements 4 of the same type, for example a list $L_1$ of the recharge cartridges 41 and a list $L_2$ of the vats 42.

As regards, furthermore, the remote server 61, it is configured to receive the univocal identification code ID of the consumable element 4 from said data processing unit 3. Furthermore, the remote server 61 is configured to proceed to compare said univocal identification code ID received with the univocal identification codes included in the predefined list L.

As already described above with regard to the validation method of the invention, said comparison makes it possible to verify if the univocal identification code ID read on the consumable element 4 is authentic and active. The remote server 61, furthermore, is configured in such a way as to send the data processing unit 3, from which it received the univocal identification code or codes ID, a signal confirming the validity of the univocal identification code or codes ID, in the case where each one of them is authentic and active.

It cannot be excluded, however, that according to alternative embodiments of the invention the remote server 61 may be configured to send a validity signal related to each single consumable element 4, in the case where the corresponding univocal identification code ID has been found to be authentic and active, independently of the outcome of the verification of any other univocal identification codes ID belonging to different consumable elements 4 installed, in any case, on the same stereolithography machine 2.

Concerning, again, the data processing unit 3, the corresponding transceiver means 33 are configured to receive said validity signal from the remote server 61 and the data processing unit 3 itself is configured in such a way that, if said validity signal is received, it will be capable of enabling the use of the consumable element or elements 4. In particular, the same data processing unit 3 is configured in such a way as to manage the operation of transferring the base material contained therein into a vat 42 present on the stereolithography machine 2, in the case where said enabling procedure is related to the specific use of a recharge cartridge 41. Said transfer operation is preferably but not necessarily carried out in an automatic manner through said first coupling means 21 that in turn comprise a mechanism 211 of the known type capable of performing the so-called "squeezing" of the recharge cartridge 41.

Concerning, again, the remote server 61, it is configured in such a way that, in the case where the univocal identification code ID received and verified belongs to a recharge cartridge 41, it will calculate the value of the total quantity of base material available for the stereolithography machine 2, the so-called "print credit", by adding the quantity of base material transferred during said transfer operation to the total quantity of material previously associated with said machine.

In particular, according to the preferred embodiment of the invention, said last piece of information is stored in a memory allocation 81 of the database 8 reserved to that specific stereolithography machine 2.

The remote server 61 is configured in such a way as to associate said new calculated value of the print credit with the stereolithography machine 2, storing it in said memory allocation 81.

Clearly, as already described with reference to the validation method of the invention, if the stereolithography machine 2, before the transfer operation, had a print credit equal to zero, the new value calculated and stored after the transfer operation would be equivalent to the quantity of base material transferred.

Furthermore, according to the invention, the remote server 61 is configured in such a way as to modify the state of the univocal identification code ID related to said recharge cartridge 41 from active to inactive in the predefined list L, in the case where the base material has been completely transferred into a vat 42 from said recharge cartridge 41.

In this way, the same recharge cartridge 41 cannot be reused any more, as explained above.

According to the preferred embodiment of the printing unit 1 of the invention, also the data processing unit 3 is configured in such a way that, following the reception of said validity signal and simultaneously with the modification carried out by the remote server 61, it will modify, through the RFID transceiver 321, the state of the univocal identification code ID of the same recharge cartridge 41 from active to inactive in the RFID tag 71 of the latter.

It cannot be excluded, however, that in alternative embodiments of the invention the data processing unit 3 may not be configured to carry out said last operation.

Concerning, again, the remote server 61, it is configured in such a way as to associate a vat 42 with the number of times the latter has been used, in the case where the univocal identification code ID received and verified belongs to said vat 42 properly installed on the stereolithography machine 2.

In other words, as already mentioned, according to the invention the number of times the univocal identification code ID related to a specific vat 42 has been read can be increased and therefore the number of times the same vat 42 has been installed and used on a stereolithography machine 2 can be updated.

Furthermore, still preferably but not necessarily, the remote server 61 is configured to associate the vat 42 with the type of base material transferred into the same vat. Both of said operations of association, in particular, are carried out by storing the number of uses and the type of material transferred in an appropriate memory allocation 82 of the database 8 reserved for that specific vat 42. In greater detail, the information concerning the type of material transferred into said vat 42 is preferably but not necessarily read from the RFID tag 71 of the recharge cartridge 41 from which said material is extracted. For this purpose, according to the invention said information is previously stored in said RFID tag 71 of the recharge cartridge 41 simultaneously with the operation of storage of the corresponding univocal identification code in the same RFID tag 71.

Finally, the remote server 61 is configured in such a way that, also in the case of reception of a univocal identification code ID related to a vat 42, it will modify the respective state from active to inactive in the predefined list L, in the case where the corresponding number of times said vat has been used reaches or exceeds a predefined number of times.

Furthermore, according to the preferred embodiment of the invention, the data processing unit 3 is configured in such a way as to enable the use of the consumable element also in the case where the univocal identification code ID read is related to a vat 42. In particular, said enabling step is performed once said data processing unit 3 has received the validity signal sent by the remote server 61 and verified the compatibility of the material to be transferred into said vat 42 with the material that is present therein, if any. Clearly, said verification is carried out by the data processing unit 3 by comparing the value related to the type of material read in the RFID tag 71 of the recharge cartridge 41 with the value related to the type of material stored in the memory allocation 82 associated with that specific vat 42. Said further verification makes it possible to avoid that two base materials that are incompatible with each other are mixed in the vat 42.

Furthermore, according to the preferred embodiment described herein, the data processing unit 3 is configured in such a way as to modify the state of the univocal identification code ID of a vat 42 from active to inactive in the corresponding RFID tag 71 through said RFID transceiver 321, also in the case where the consumable element 4 corresponds to the vat 42 itself.

Furthermore, the data processing unit 3 is configured to store in the same RFID tag 71 of the vat 42 also the number of times the latter has been used and the type of base material transferred therein, simultaneously with the operation performed by the remote server 61 in the memory allocation 82 related to the same vat 42.

The validation system 5 belonging to the printing unit 1, furthermore, is configured to carry out the steps of the method of the invention for enabling said stereolithography machine 2 to carry out the printing process.

In particular, in order to implement said method, the data processing unit 3 is configured to compare the value of the total quantity of material associated with the stereolithography machine 2 and stored in the memory allocation 81 with the quantity of base material that is necessary for making the three-dimensional object or objects that have to be produced. The data processing unit 3 is also configured in such a way as to enable the stereolithography machine 2 to carry out the printing process, in the case where said total quantity of base material is equal to or exceeds the quantity of base material necessary for making said three-dimensional object or objects.

It cannot be excluded, however, that according to an alternative embodiment of the invention said comparison may be carried out by the remote server 61. In particular, according to this last alternative embodiment, the data processing unit 3 may be configured to send the remote server 61 the information concerning the quantity of base material necessary for making a specific three-dimensional object. In turn, the remote server 61 is configured in such a way that it can compare the information it has received with the total quantity of base material associated with that specific stereolithography machine 2, stored in said memory allocation 81.

The remote server 61 may be configured in such a way that if, following said comparison, the total quantity of base material associated with the stereolithography machine 2 is equal to or exceeds the quantity of base material that is necessary for making the three-dimensional object, it will send the data processing unit 3 a signal intended to enable the printing process.

In any way, according to both the preferred embodiment of the invention and said alternative embodiment, the data processing unit 3 is configured in such a way that it can manage the printing operations in order to print, even partially, the three-dimensional object by means of said sterolithography machine 2, in case of a positive outcome of said comparison. The data processing unit 3, furthermore, is configured in such a way that, at the end of the printing step, it will calculate, together with the remote server 61, the quantity of base material actually used during said step and update the total quantity of base material associated with the stereolithography machine 2, deducting said quantity of base material actually used from the total quantity.

Finally, the remote server 61 is configured to proceed with the storage of said new value of the total quantity of base material, or of the print credit, in said memory allocation 81 reserved for that specific stereolithography machine 2. According to an alternative embodiment of the invention, the printing unit 1 may comprise a plurality of stereolithography machines 2 located in the same site, as shown in FIG. 4, and the remote server 61 may be configured to carry out the steps described above and assigned to it, in such a way as to manage said plurality of stereolithography machines 2 as a single entity.

This alternative solution would make it possible to consider a single print credit for said plurality of stereolithography machines 2, independently of the quantity of material actually available for each single stereolithography machine 2.

Consequently, the procedure for enabling the printing process would be managed for the plurality of stereolithography machines 2 as a whole. In other words, with this configuration two different situations would be possible: either all of the stereolithography machines 2 belonging to said plurality are potentially enabled to carry out the printing process, or none of them can proceed to printing a three-dimensional object. This would advantageously make it possible to considerably simplify the implementation of the methods of the invention described above and also to increase the margin of freedom allowed to the user or to the company that owns said plurality of stereolithography machines.

Figure 5:
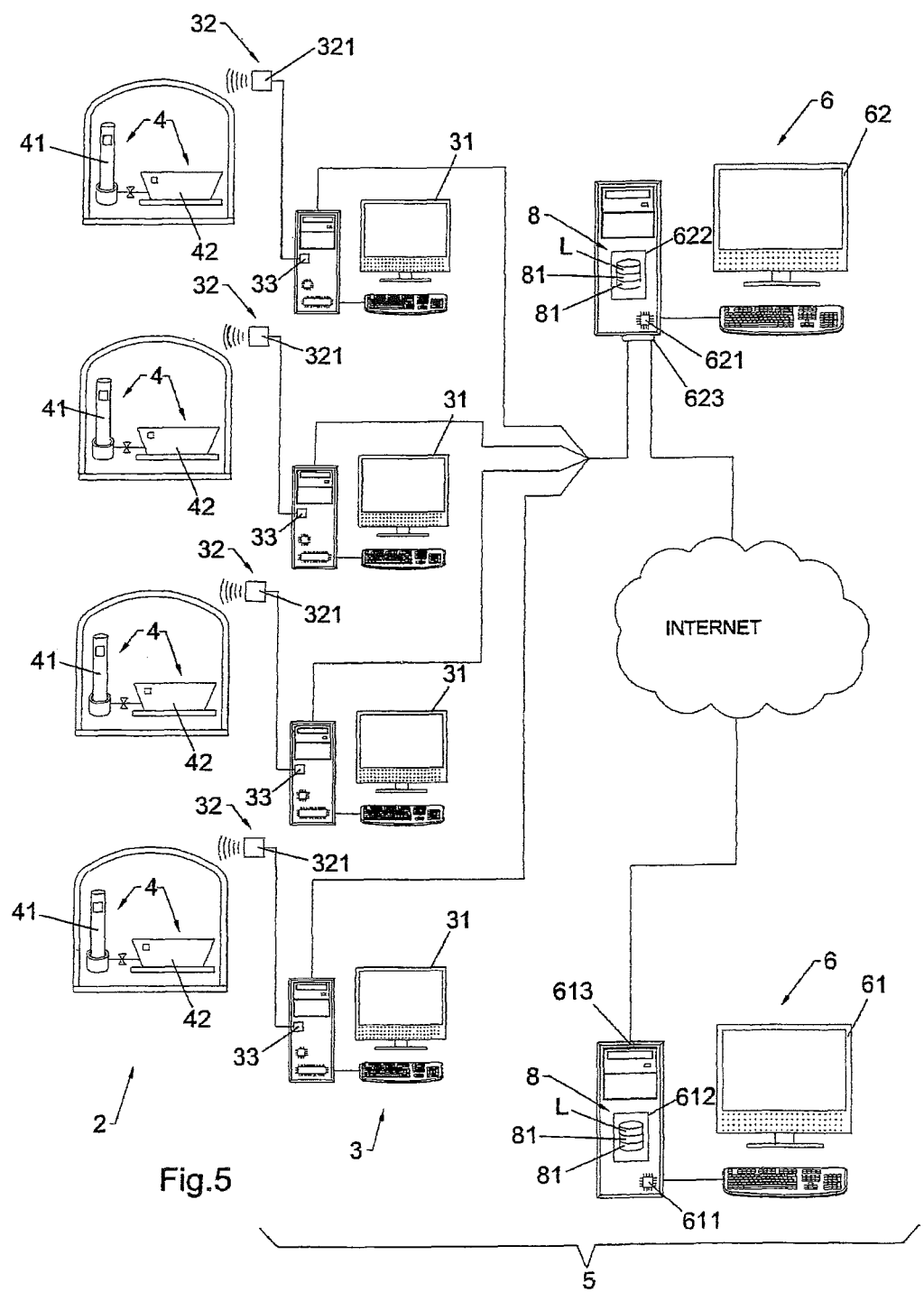
FIG. 5 shows a schematic structural diagram of the printing unit of the invention according to a second alternative embodiment.

Furthermore, according to another alternative embodiment of the printing unit 1 of the invention, as shown in FIG. 5, the data processing control apparatus 6 may comprise, in addition to the remote server 61 described above, also a local server 62 located in the same site where one or more stereolithography machines 2 are located. Said local server 62, in particular, is operatively connected, preferably through an Intranet connection, to the data processing unit or units 3 that in turn are associated with said stereolithography machines 2. Said two servers 61 and 62, furthermore, are configured in such a way that they can communicate with each other through the Internet.

Differently from the preferred embodiment described above, in this case both of the servers 61 and 62 are provided with the database 8, stored in the corresponding storage means 612 and 622 and comprising the predefined list L of univocal identification codes ID and the various memory allocations 81 and 82 reserved for the stereolithography machines 2 and the vats 42. However, according to said alternative embodiment of the invention, the database 8 present in the remote server 61 includes the memory allocations of all the stereolithography machines 2 present on the market and produced by a specific company, while the database 8 present in the local server 62 includes exclusively the memory allocations 81 reserved for the stereolithography machines 2 located in the same site where the local server 62 itself is located.

According to said alternative embodiment of the printing unit 1 of the invention, furthermore, the local server 62 is configured in such a way that it can carry out all the steps assigned to the remote server 61 according to the preferred embodiment of the invention described above. In addition to the above, according to said alternative embodiment of the invention, both of the servers 61 and 62 are configured to synchronize the respective databases 8 at predefined time intervals.

Said particular embodiment of the invention advantageously makes it possible to carry out the steps of the validation method and of the method for enabling the printing process that are the subjects of the invention also in case of absence of an Internet connection, as all the procedures are managed by the local server 62 together with the data processing units 3 associated with the various stereolithography machines 2. Clearly, once communication between the local server 62 and the remote server 61 has been re-established, it is necessary to resynchronize the information contained in the respective databases 8, in such a way as to update and share at a global level the various situations which occurred at a local level.

Going back, finally, to the preferred embodiment of the printing unit 1 of the invention, according to the same, each consumable element 4, in addition to being provided with the RFID tag 71, in which the related univocal identification code ID is stored, is provided with said univocal identification code ID also in a different form suited to be read by a human being or by means of an electronic reading device. For example, the univocal identification code ID may be reproduced on the consumable element 4 in the form of alphanumeric characters or in the form of a bar code, more specifically a QR code.

As is defined in detail here below, the combination of said univocal identification code ID which is reproduced as an alphanumeric code or a bar code with an external mobile device provided with a connection to the cellular network like, for example, a smartphone, and with a particular configuration of the remote server 61 and the data processing unit 3 makes it possible to define a redundant system that, in case of absence of direct communication between the remote server 61 and the data processing unit 3, makes it possible to proceed with the validation of the consumable elements 4 and to enable the stereolithography machine 2 to carry out the printing process.

In particular, said mobile device, through the installation and execution of an appropriate application, makes it possible to read or enter manually the univocal identification code ID present in a consumable element 4 and to send said code to the remote server 61.

In turn, the remote server 61 is configured to receive said univocal identification code ID, so that it can process it and compare it against the predefined list L of univocal identification codes ID. The remote server 61 is configured to send a validity code to the same mobile device in the case where said code which has been received is actually authentic and active.

Furthermore, the data processing unit 3, which is associated with the stereolithography machine 2 where said consumable element 4 has been installed, is properly configured so as to allow said validity code to be entered by a user in a user interface loaded in the same data processing unit 3. The data processing unit 3 is configured in such a way that, once said validity code has been received, it will compare the latter with the univocal identification code ID read by the RFID tag 71 of the same consumable element 4. The data processing unit 3 is configured in such a way as to enable the use of said consumable element 4, with no need to directly interrogate said remote server 61, in the case where said comparison determines a correspondence between the two codes.

Computer Program and Computer Program Product.

The invention includes also a computer program comprising a plurality of data processing instructions capable of carrying out all the steps of the methods described above when said computer program is being executed in one or more computers.

Finally, the invention includes also a computer program product comprising a plurality of data processing information stored in storage means of the readable type for the implementation of the methods described above when said computer program product is being executed in one or more computers.

In particular, according to the preferred embodiment of the invention, said computer program and said computer program product are executed partially in said data processing control apparatus and partly in the data processing unit associated with a stereolithography machine.

Based on what has been stated above, therefore, the method for validating consumable elements and the method for enabling a stereolithography machine to carry out the printing process that are the subjects of the invention achieve all of the preset objects.

In particular, the invention achieves the object to provide a method for validating consumable elements and a method for enabling the printing of three-dimensional objects that prevent the use of consumable elements that, although being sold as compatible, are not perfectly suited to be used with certain types of stereolithography machines.

The invention also achieves the object to provide a validation method and a method for enabling the printing process that prevent the use of low quality consumable elements and, in particular, of low quality base materials.

Finally, the invention also achieves the object to provide a validation method and a method for enabling the printing process that prevent the use of consumable elements that can deteriorate the internal components of the stereolithography machine on which they are installed.

The invention claimed is:

1. Printing unit comprising two or more stereolithography machines and at least one data processing unit configured in such a way as to manage the functions of each one of said stereolithography machines for printing three-dimensional objects through a stereolithography process, wherein each one of said stereolithography machines comprises first coupling means for the installation of at least one recharge cartridge of a base material to be used for making said three-dimensional objects, said one recharge cartridge being provided with a univocal identification code, said printing unit being characterized in that it comprises a validation system of at least said one recharge cartridge, said validation system being provided with:
   said at least one data processing unit comprising reading means configured to read said univocal identification code of said recharge cartridge, and transceiver means configured in such a way as to transmit said univocal identification code to a remote server configured to communicate with said data processing unit through an Internet connection;
   said remote server comprising storage means having a predefined list of univocal identification codes, considered authentic and active, related to said recharge cartridges stored therein and said remote server having a memory allocation in said storage means that is reserved to each one of said stereolithography machines, said remote server being configured to:
   receive said univocal identification code related to said recharge cartridge from said data processing unit;
   compare said univocal identification code with said predefined list in order to verify that said univocal identification code is authentic and active;
   send a signal of validity of said univocal identification code to said data processing unit in a case where said univocal identification code is authentic and active;
   said transceiver means of said data processing unit furthermore being configured to receive said signal of validity and, after receiving said signal of validity, to transfer a quantity of said base material from said recharge cartridge to a vat arranged on one of said stereolithography machines, and said remote server furthermore being configured to:
   calculate the value of the total quantity of base material available for each one of said stereolithography machines by adding the quantity of base material transferred during said transfer operation to the total quantity of base material previously associated with each one of said stereolithography machines and stored in said memory allocation;
   associate said calculated value of the total quantity of material with each one of said stereolithography machines, storing said value in said memory allocation;
   modify the state of said univocal identification code related to said recharge cartridge from active to inactive in said predefined list, in a case where said base material was completely transferred from said recharge cartridge into said vat.

2. Printing unit according to claim 1, characterized in that said remote server is configured in such a way that, in a case where two or more consumable elements are installed on one of said stereolithography machines, it will send said signal of validity to said data processing unit, on condition that the univocal identification codes of each one of said consumable elements are authentic and active.

3. Printing unit of the type according to claim 2, characterized in that said data processing unit is configured to:
   compare said value of the total quantity of base material associated with each one of said stereolithography machines and stored in said memory allocation with a quantity of base material necessary for making said three-dimensional object;
   enable one of said stereolithography machines to carry out the printing process, in a case where said total quantity of base material associated with said stereolithography machine is equal to or exceeds said quantity of base material necessary for making said three-dimensional object.

4. Printing unit according to claim 2, characterized in that each one of said consumable elements is provided with a storage and transmission device in which said univocal identification code is stored.

5. Printing unit according to claim 4, characterized in that:
   said storage and transmission device present in each one of said consumable elements is a RFID tag;
said reading means are constituted by a RFID transceiver.

6. Printing unit of the type according to claim 1, characterized in that said data processing unit is configured to:
   compare said value of the total quantity of base material associated with each one of said stereolithography machines and stored in said memory allocation with a quantity of base material necessary for making said three-dimensional object;
   enable one of said stereolithography machines to carry out the printing process, in a case where said total quantity of base material associated with said stereolithography machine is equal to or exceeds said quantity of base material necessary for making said three-dimensional object.

7. Printing unit of the type according to claim 6, characterized in that each one of said consumable elements is provided with a storage and transmission device in which said univocal identification code is stored.

8. Printing unit according to claim 7, characterized in that:
   said storage and transmission device present in each one of said consumable elements is a RFID tag;

said reading means are constituted by a RFID transceiver.

9. Printing unit according to claim 1, characterized in that each one of said consumable elements is provided with a storage and transmission device in which said univocal identification code is stored.

10. Printing unit according to claim 9, characterized in that:
- said storage and transmission device present in each one of said consumable elements is a RFID tag;
- said reading means are constituted by a RFID transceiver.

11. Printing unit comprising two or more stereolithography machines and at least one data processing unit configured in such a way as to manage the functions of each one of said stereolithography machines for printing three-dimensional objects through a stereolithography process, wherein each one of said stereolithography machines comprises second coupling means for installing, as at least one consumable element, at least one vat suited to contain the material to be used for making said three-dimensional objects, said vat being provided with a univocal identification code, said printing unit being characterized in that it comprises a validation system of at least one vat, said validation system being provided with:
- said at least one data processing unit comprising reading means configured to read said univocal identification code of said vat and transceiver means configured in such a way as to transmit said univocal identification code to a remote server configured to communicate with said data processing unit through an Internet connection;
- said remote server comprising storage means having a predefined list of univocal identification codes, considered authentic and active, related to at least said vat stored therein and said remote server having a memory allocation in said storage means that is reserved for each one of at least said vat with said univocal identification code, said remote server being configured to:
- receive said univocal identification code related to at least said vat from said data processing unit;
- compare said univocal identification code with said predefined list in order to verify that said univocal identification code is authentic and active;
- send a signal of validity of said univocal identification code to said data processing unit in the case where said univocal identification code is authentic and active;
- said transceiver means of said data processing unit furthermore being configured to receive said signal of validity, and said data processing unit being configured to enable the use of said vat in the stereolithography machine where at least said vat is installed in case of reception of said signal of validity, and said remote server furthermore being configured to:
- associate said vat with the number of uses of said vat by storing said number in said memory allocation;
- associate said vat with a type of base material transferred therein by storing said type of base material in said memory allocation;
- modify the state of said univocal identification code related to said vat from active to inactive in said predefined list, in a case where said number of uses reaches or exceeds a predefined number of uses.

12. Printing unit according to claim 11, characterized in that said remote server is configured in such a way that, in a case where two or more consumable elements are installed on one of said stereolithography machines, it will send said signal of validity to said data processing unit, on condition that the univocal identification codes of each one of said consumable elements are authentic and active.

13. Printing unit of the type according to claim 12, characterized in that said data processing unit is configured to:
- compare said value of the total quantity of base material associated with each one of said stereolithography machines and stored in said memory allocation with a quantity of base material necessary for making said three-dimensional object;
- enable one of said stereolithography machines to carry out the printing process, in a case where said total quantity of base material associated with said stereolithography machine is equal to or exceeds said quantity of base material necessary for making said three-dimensional object.

14. Printing unit according to claim 12, characterized in that each one of said consumable elements is provided with a storage and transmission device in which said univocal identification code is stored.

15. Printing unit according to claim 14, characterized in that:
- said storage and transmission device present in each one of said consumable elements is a RFID tag;
- said reading means are constituted by a RFID transceiver.

16. Printing unit of the type according to claim 11, characterized in that said data processing unit is configured to:
- compare said value of the total quantity of base material associated with each one of said stereolithography machines and stored in said memory allocation with a quantity of base material necessary for making said three-dimensional object;
- enable one of said stereolithography machines to carry out the printing process, in a case where said total quantity of base material associated with said stereolithography machine is equal to or exceeds said quantity of base material necessary for making said three-dimensional object.

17. Printing unit according to claim 11, characterized in that each one of said consumable elements is provided with a storage and transmission device in which said univocal identification code is stored.

18. Printing unit according to claim 17, characterized in that:
- said storage and transmission device present in each one of said consumable elements is a RFID tag;
- said reading means are constituted by a RFID transceiver.

* * * * *